(12) United States Patent
Wilson et al.

(10) Patent No.: US 10,789,586 B2
(45) Date of Patent: Sep. 29, 2020

(54) TRANSACTION VERIFICATION BASED ON A TRANSACTION IDENTIFIER AND ASSOCIATED LOCATION DATA

(71) Applicant: MasterCard International Incorporated, Purchase, NY (US)

(72) Inventors: John Alan Wilson, Rochester Hills, MI (US); Dorene Ervans Stuart, Troy, MI (US); Derrick Michael Braga, Rochester Hills, MI (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 284 days.

(21) Appl. No.: 15/831,067

(22) Filed: Dec. 4, 2017

(65) Prior Publication Data

US 2019/0172044 A1 Jun. 6, 2019

(51) Int. Cl.
| | |
|---|---|
| *G06Q 20/02* | (2012.01) |
| *G06Q 20/32* | (2012.01) |
| *G06Q 20/38* | (2012.01) |
| *G06Q 20/10* | (2012.01) |
| *G06Q 20/40* | (2012.01) |

(52) U.S. Cl.
CPC ......... *G06Q 20/3224* (2013.01); *G06Q 20/02* (2013.01); *G06Q 20/10* (2013.01); *G06Q 20/3226* (2013.01); *G06Q 20/385* (2013.01); *G06Q 20/389* (2013.01); *G06Q 20/4014* (2013.01)

(58) Field of Classification Search
CPC .... G06Q 20/00; G06Q 20/32; G06Q 20/3226; G06Q 20/02

USPC .......................................................... 705/44
See application file for complete search history.

(56) References Cited

U.S. PATENT DOCUMENTS

| | | | |
|---|---|---|---|
| 5,883,810 A | 3/1999 | Franklin | |
| 6,675,017 B1 * | 1/2004 | Zellner | H04W 8/16 |
| | | | 455/456.1 |
| 7,590,547 B2 | 9/2009 | Lagadec et al. | |
| 8,412,626 B2 | 4/2013 | Hirson et al. | |
| 8,423,457 B1 | 4/2013 | Schattauer et al. | |

(Continued)

FOREIGN PATENT DOCUMENTS

WO 2004/049621 6/2004

*Primary Examiner* — Robert R Niquette
*Assistant Examiner* — Liz P Nguyen

(57) ABSTRACT

The disclosure facilitates a transaction by verifying a transaction claim request. An initiation request, including sender location data indicating a sender location, is received from a sender. A first transaction identifier associated with the transaction and the sender location data are recorded in a data structure. A claim request is received from a candidate recipient, the claim request including a second transaction identifier and recipient location data indicating a recipient location. The first and second transaction identifier are compared. The sender location and recipient location are compared based on a defined range. Based on the first and second transaction identifiers matching and the recipient location being within the defined range of the sender location, the claim request is verified, providing confirmation that the recipient is an intended recipient. Verifying transactions based on identifiers and location data enhances transaction security while preserving the privacy of parties' personal information.

20 Claims, 5 Drawing Sheets

(56) References Cited

U.S. PATENT DOCUMENTS

| | | |
|---|---|---|
| 9,166,823 B2 * | 10/2015 | Karmarkar .............. H04L 51/38 |
| 2010/0223183 A1 | 9/2010 | Smith |
| 2011/0119190 A1 | 5/2011 | Mina |
| 2011/0161232 A1 | 6/2011 | Brown |
| 2012/0322032 A1 | 12/2012 | Smith |
| 2013/0018779 A1 | 1/2013 | Laquerre |
| 2013/0159186 A1 | 6/2013 | Brudnicki |
| 2014/0108172 A1 * | 4/2014 | Weber .................... G06Q 20/20 705/17 |
| 2016/0012465 A1 | 1/2016 | Sharp |
| 2016/0239840 A1 | 8/2016 | Preibisch |

* cited by examiner

TRANSACTION VERIFICATION BASED ON A TRANSACTION IDENTIFIER AND ASSOCIATED LOCATION DATA

BACKGROUND

Modern computing devices and networks enable users to make peer to peer (P2P) transactions and other transactions using applications, websites, or other types of web portals. A user may select to send money to a friend using a wallet application on a mobile phone and that money will be delivered from an account of the user to an account of the friend. Typically, such wallet applications, transaction applications, or the like require each party to a transaction (e.g., sending and receiving) to have a presence with the wallet service provider, including a means of identifying the receiving party. In some examples, wallet applications enable users to execute transactions with others based on providing the receiving party's email address, username, phone number, or other identifier.

The identifiers required by current wallet applications work well for transactions with familiar people whose personal identifiers are known to the sending party. When friends already know each other's email addresses, this form of identification is a natural fit for identifying parties of a transaction through a wallet application. However, in some instances, a user may want to execute a transaction with a person with whom they are unfamiliar. Yielding personal identifying information, such as a phone number or email address, to an unfamiliar person such as a server at a restaurant or a private seller is not ideal, as it may result in undesirable contact in the future or even identity theft.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for facilitating a transaction is described, the method comprises receiving an initiation request associated with a transaction from a sender. The initiation request includes sender location data indicating a sender location. A first transaction identifier associated with the transaction and the sender location data are recorded in a data structure. A claim request associated with the transaction is received from a candidate recipient, the claim request including a second transaction identifier and recipient location data indicating a candidate recipient location. The first transaction identifier and the second transaction identifier are compared. The sender location and the candidate recipient location are compared based on a defined range. Based on the first and second transaction identifiers matching and the candidate recipient location being within the defined range of the sender location, a verification of the claim request is provided confirming the candidate recipient is an intended recipient.

Many of the attendant features will be more readily appreciated as the same becomes better understood by reference to the following detailed description considered in connection with the accompanying drawings.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 5, the systems are illustrated as schematic drawings. The drawings may not be to scale.

DETAILED DESCRIPTION

Figure 1:
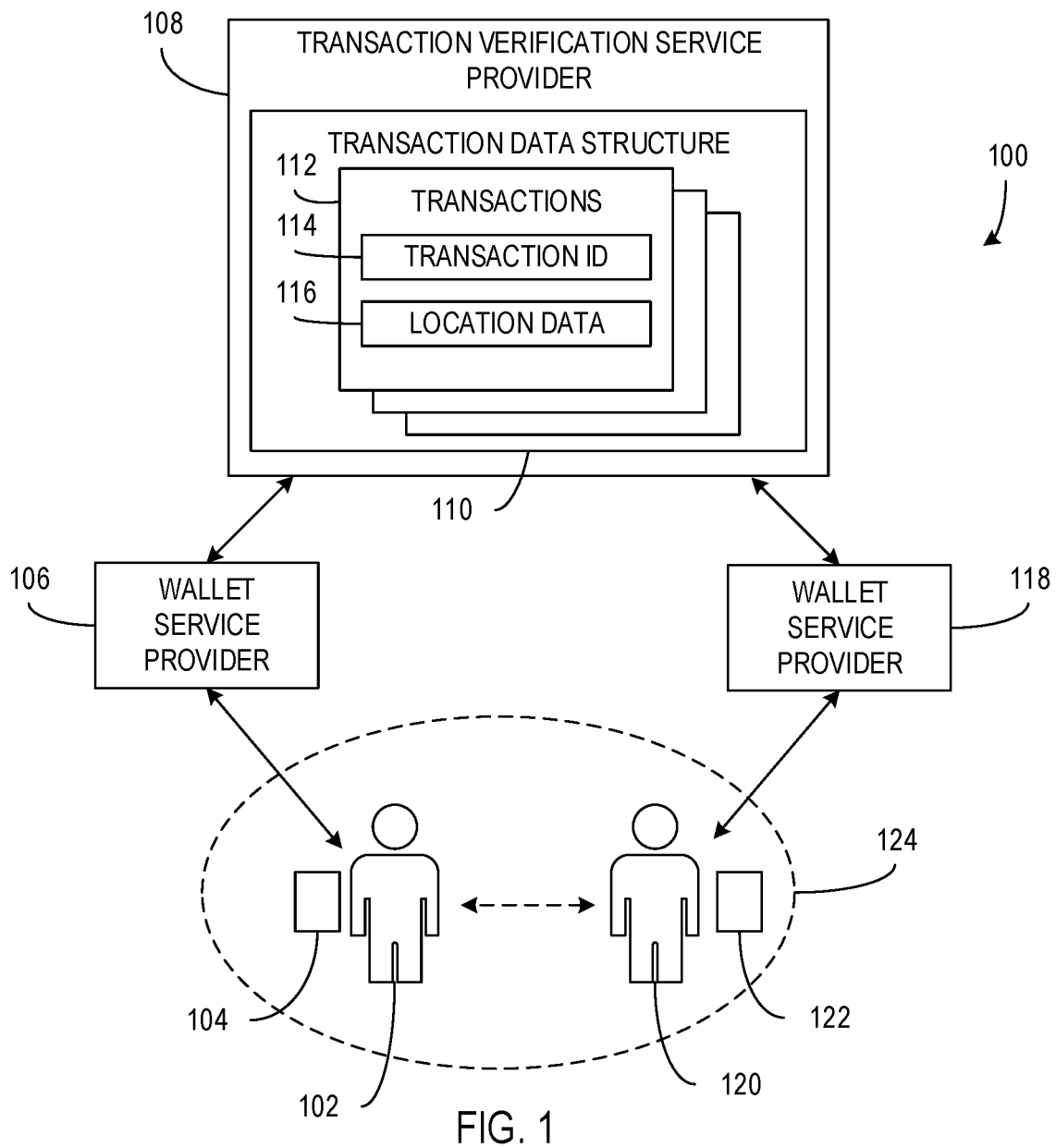
FIG. 1 is an exemplary block diagram illustrating a system configured for facilitating a transaction based on a transaction identifier and associated location data according to an embodiment.

The systems and methods described herein are configured to facilitate a transaction by verifying a claim request based on a transaction identifier and location data. The disclosure enables peer to peer (P2P) transactions between unfamiliar parties using modern wallet applications by verifying sender and recipient identities without requiring valuable personal information to be shared.

An initiation request, including sender location data indicating a sender location, is received from a sender. A first transaction identifier associated with the transaction and the sender location data are recorded in a data structure. A claim request is received from a candidate recipient, the claim request including a second transaction identifier and recipient location data indicating a recipient location. The first and second transaction identifier are compared. The sender location and recipient location are compared based on a defined range. Based on the first and second transaction identifiers matching and the recipient location being within the defined range of the sender location, the claim request is verified, providing confirmation that the recipient is an intended recipient.

The use of a transaction identifier that is shared between the sender and recipient provides a way for the recipient to be identified without either the sender or recipient needing to share private personal information. Further, the additional requirement of matching location data within a defined range provides enhanced security, preventing attempts to fraudulently claim transactions by, for instance, trying to guess transaction identifiers to claim transactions. Because claiming a transaction requires matching at least these two points of data, the transaction identifier and the location data, fraudulently claiming a transaction would require guessing of the transaction identifier and either guessing a correct zip code or other location code, generating fake global positioning system (GPS) data, or the like. Thus, the disclosure provides enhanced security for the transaction. Further, the described systems and methods provide a fast, user-friendly way to tip for services and make one-time P2P transactions using modern computing devices and associated transaction applications.

The disclosure further improves the functioning of a computing device by providing a method for a sender to initiate a transaction with a recipient without sharing personal or otherwise private information with the recipient. Further, initiating and/or receiving a transaction is made more user-friendly, requiring only an exchange of a relatively simple transaction identifier instead of, for instance, a lengthy email address or the like, which may be difficult for a sender or recipient to enter and/or remember. A transaction executed using the method described herein may be rapidly completed by the parties to the transaction by sharing an easy-to-remember code or by scanning a bar code displayed on the sender's mobile device, etc.

FIG. 1 is an exemplary block diagram illustrating a system 100 configured for facilitating a transaction based on a transaction identifier (ID) and associated location data according to an embodiment. A sender 102 may execute a transaction to a recipient 120 (e.g., make a tip, P2P payment, money transfer, etc.) through use of the system 100. The sender 102 has a computing device 104 (e.g., a mobile phone, tablet, laptop, etc.) that he/she uses to initiate a transaction via a wallet service provider 106. Interactions with the wallet service provider 106 may include an application, application programming interface (API), website, and/or other web portal using the computing device 104. The sender 102 provides location data indicating the sender's current location or other desired location with the initiation of the transaction. The location data may be provided automatically by the computing device 104 (e.g., GPS location data, etc.) and/or based on input from the sender 102. In some examples, the sender is offered a chance to verify the sender location data prior to sending the initiation request.

The wallet service provider 106 communicates with the transaction verification service provider 108. The transaction verification service provider 108 stores and/or manages information associated with transactions 112 in a transaction data structure 110. The information stored in the transaction data structure may include transaction identifiers (IDs) 114 (e.g., numbers and/or codes that uniquely identify a transaction, passphrases, etc.), location data 116, such as data indicating a location 124 in or near which a transaction was initiated provided by the computing device 104 (global positioning system (GPS) data, other satellite data, cellular tower identification and/or triangulation data, zip-code data, etc.), and other transaction data, such as a transaction amount value, a transaction memo or message, etc. In some examples, the wallet service provider 106 may create and/or assign a transaction ID to a transaction that is unique to the transaction within the wallet service provider 106, but different from a transaction ID 114 stored at the transaction verification service provider 108. In that case, an index or mapping of the transaction IDs for the wallet service provider 106 to the transaction IDs 114 for the transaction verification service provider 108 may be stored at the transaction data structure 110 and/or at the wallet service provider 106.

In some examples, the wallet service providers 106 and 118 and the transaction verification service provider 108 are part of and/or are controlled by separate entities (e.g., separate companies, etc.) and communicate over external network(s) via exposed APIs or the like. In alternative examples, the wallet service providers 106 and 118 and the transaction verification service provider 108 are part of and/or controlled by the same entity, such that the communications and/or interactions therebetween may be over external and/or internal networks. It should further be understood that other combinations and/or arrangements of entities and/or networks are contemplated within the scope of the description herein.

The transaction ID 114 of a transaction 112 may be provided to the sender 102 via the computing device 104 once it is generated or otherwise created at the transaction verification service provider 108. Alternatively, the sender 102 may provide the transaction ID 114 to the transaction verification service provider 108 via the wallet service provider 106 when the sender 102 initiates the transaction, such that the sender 102 is aware of the transaction ID 114 immediately upon transaction initiation.

The sender 102 may communicate the transaction ID 114 to the recipient 120 by word of mouth, writing it down, etc. The use of the transaction ID 114 for facilitating the transaction 112 enables the sender 102 to provide a transaction 112 to a recipient 120 without sharing other personal information with the recipient 120 (e.g., sharing e-mail addresses, usernames, phone numbers, etc.), maintaining relative security of the sender's identity while making a transaction to an unfamiliar recipient 120 (e.g., a customer at a restaurant tipping the wait staff, etc.).

The recipient 120 may interact with a wallet service provider 118 via a computing device 122 (e.g., a mobile phone, tablet, laptop computer, etc.) to claim a transaction 112 that has been initiated by the sender 102. The wallet service provider 118 may be the same service provider as wallet service provider 106, or it may be a different service provider. The recipient 120 may claim the transaction 112 using an application, API, website, or other web portal associated with the wallet service provider 118.

When the recipient 120 claims the transaction 112, the wallet service provider 118 communicates with the transaction verification service provider 108 to verify that the recipient 120 is the intended recipient of the transaction 112. The transaction verification service provider 108 may provide an API, application, website, or other web portal through which wallet service providers 106 and/or 118 may initiate and verify transactions as described herein.

Figure 2:
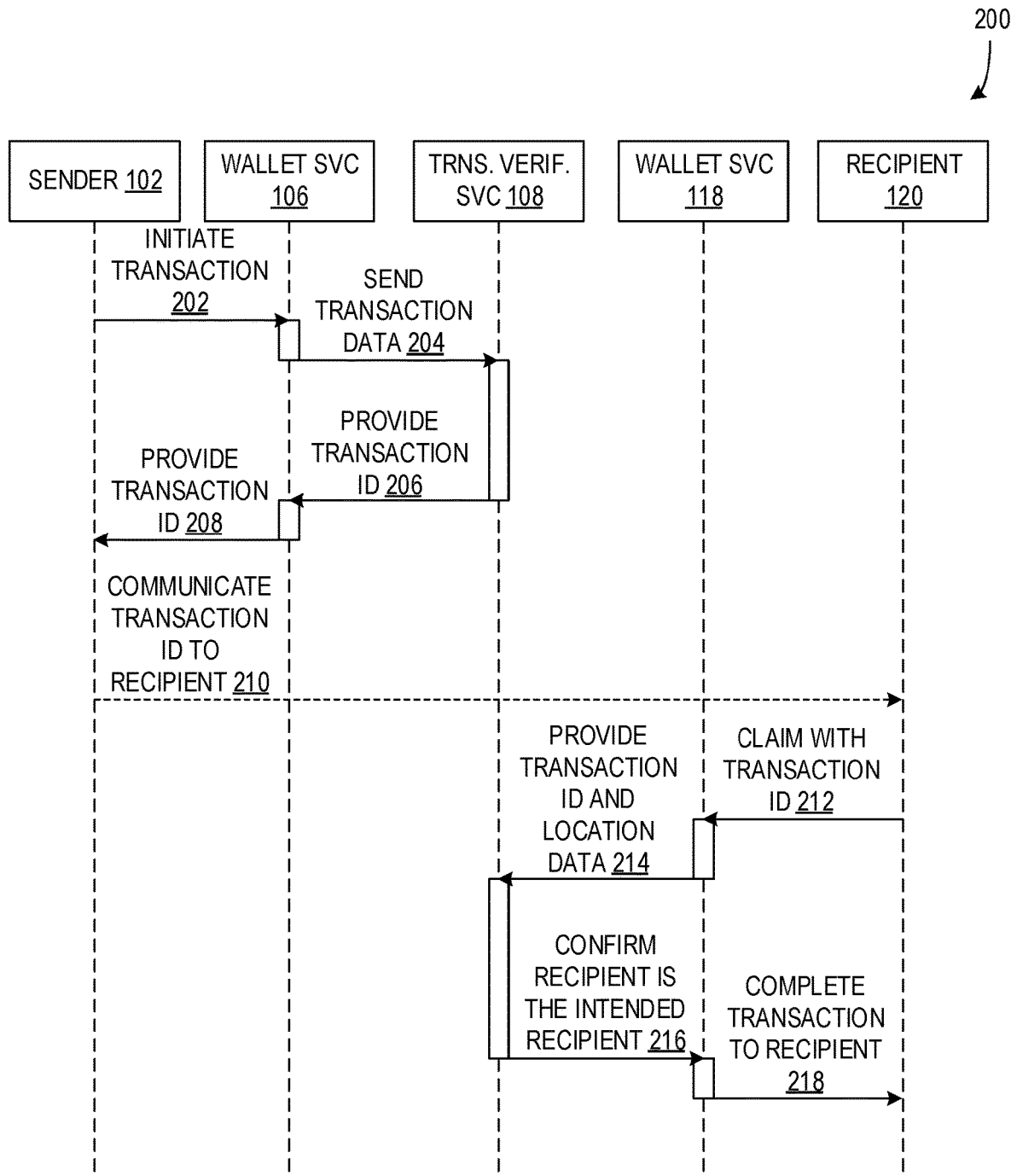
FIG. 2 is an exemplary interaction diagram illustrating interactions between entities of the system of FIG. 1 according to an embodiment.

FIG. 2 is an exemplary interaction diagram 200 illustrating interactions between entities of the system 100 of FIG. 1 according to an embodiment. At 202, the sender 102 initiates a transaction with the wallet service provider 106. The initiation may include the sender 102 accessing a wallet service provider 106 application or other portal on a computing device (e.g., computing device 104, etc.). The sender 102 may provide a transaction amount and may select or otherwise provide account information, bank information, and/or routing information associated with an account from which the sender 102 wishes the transaction amount to be transferred. In an example, a wallet service provider 106 app is configured to include one or more of the sender 102's accounts from which the sender 102 makes transactions and the sender 102 selects one of the accounts upon initiating a transaction. Further, the sender 102 may provide location data for association with the transaction, such as a zip code, a map location, a name and/or address of a location (e.g., a restaurant or other business, etc.), or the like. The location data may be generated automatically at the sender's computing device at the time of the sender initiating the transaction using global positioning system (GPS) data, cellular network data, or the like.

In some examples, the sender 102 does not provide information about the recipient when initiating the transaction. The sender 102 may have an intended recipient in mind (e.g., a server at a restaurant, a driver, other service provider, an unfamiliar person from whom the sender 102 is purchasing goods, etc.), but the sender 102 need not identify the recipient to the wallet service provider 106. The recipient identifies themselves upon providing a transaction identifier when claiming the transaction as described below.

At 204, the wallet service provider 106 sends transaction data to the transaction verification service provider 108. The transaction data includes the location data and may include other associated data for the transaction verification service provider 108 to verify a claim to the transaction. Other transaction data may include an identifier associated with the wallet service provider 106, an identifier associated with a bank and/or account from which the transaction will be withdrawn, a transaction amount, or the like. Additionally, the wallet service provider 106 may arrange for the transaction to be executed upon claiming based on provided bank information, account information, and the like.

At 206, the transaction verification service provider 108 provides a transaction ID (e.g., transaction ID 114, etc.) associated with the transaction to the wallet service provider 106 and the wallet service provider 106 provides the transaction ID to the sender 102 at 208. The transaction verification service provider 108 may generate a transaction ID upon receiving the transaction data at 204. The transaction ID may be in the form of a combination of letters, digits, and/or symbols.

At 210, the sender 102 communicates the transaction ID to the recipient 120. In some examples, the generated transaction ID may be of a uniform length (e.g., 4, 5, or 6 characters, etc.), and include only letters and/or digits, such that it may be communicated to a recipient (e.g., recipient 120, etc.) verbally, in writing, or via a device interface (e.g., on a screen, over a speaker, etc.) without requiring significant memorization. Uniform formats may be used for the transaction ID (e.g., 6 digits, 6 letters, 3 digits followed by 3 letters, etc.).

Alternatively, the generated transaction ID may include a code that may be communicated and/or read by a computing device (e.g., a bar code, a quick response (QR) code, etc.) so that senders may share the transaction ID with recipients using a screen interface of a computing device (e.g., scanning a QR code from the sender's device screen using a camera on the recipient's device, etc.).

At 212, the recipient 120 accesses the wallet service provider 118 to claim the transaction with the transaction ID. The recipient 120 may access the wallet service provider 118 via an application, API, website, or other web portal using a computing device (e.g., computing device 122, etc.). The recipient 120 provides the transaction ID to the wallet service provider 118 by typing or otherwise entering it into the application or other portal on the recipient's computing device. Further, the recipient 120, or the recipient 120's computing device, via the wallet service provider 118 API or portal, may provide location data associated with the recipient 120's current location. In some examples, the recipient 120 provides, to the wallet service provider 118, account information of an account to which the recipient 120 wants to direct the transaction.

At 214, the wallet service provider 118 provides the transaction ID and the location data received from the recipient 120 to the transaction verification service provider 108 in a request to verify that the recipient 120 is the intended recipient of the transaction. The transaction verification service provider 108 compares the provided transaction ID and location data to stored transaction IDs and location data. If the provided transaction ID and location data match the stored transaction ID and location data of a transaction, the recipient 120 is verified for that transaction.

At 216, when the recipient 120 is verified, the transaction verification service provider 108 confirms, to the wallet service provider 118, that the recipient 120 is the intended recipient. Upon confirmation, the wallet service provider 118 may cause the transaction to be completed to the recipient at 218. The wallet service provider 118, if different from the wallet service provider 106, may communicate with the wallet service provider 106 to complete the transaction. Alternatively, or additionally, the wallet service provider 118 may interact with banks or other account holders associated with the sender 102's account and/or the recipient 120's account to complete the transaction.

Figure 3:
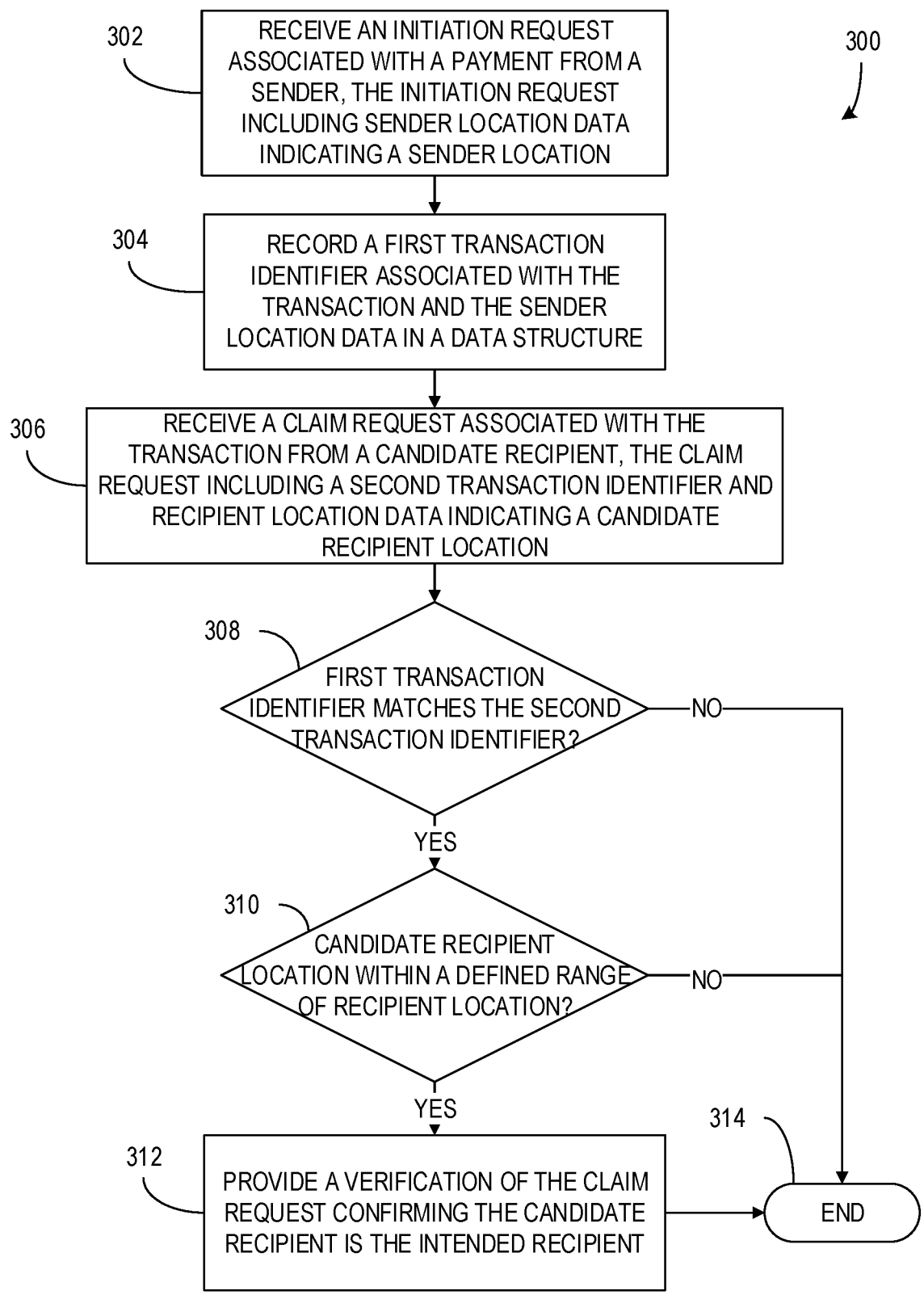
FIG. 3 is an exemplary flow chart illustrating facilitating a transaction including verifying a recipient based on a transaction identifier and associated location data according to an embodiment.

FIG. 3 is an exemplary flow chart 300 illustrating facilitating a transaction including verifying a recipient based on a transaction ID and associated location data according to an embodiment. In an example, the method described by the flowchart 300 is executed by a transaction verification service provider (e.g., transaction verification service provider 108, etc.). At 302, an initiation request associated with a transaction from a sender is received. The initiation request includes sender location data indicating a location of the sender. The initiation request may also include other data, such as a transaction ID selected by the sender, a transaction amount, sender account data, transaction claim settings or preferences, etc.

At 304, a first transaction ID associated with the transaction and the sender location data are recorded in a data structure (e.g., transaction data structure 110, etc.). The first transaction ID may be generated at the transaction verification service provider or provided by the sender, as described herein. In an example, the first transaction ID and the sender location data are stored in the data structure without information related to the identity of the intended recipient of the transaction. Rather, the recipient will identify themselves when providing a matching transaction ID and location data when claiming the transaction.

Once the first transaction ID and associated sender location data are recorded in the data structure, a claim request associated with the transaction may be received from a candidate recipient at 306. The claim request includes a second transaction ID and recipient location data indicating the location of the candidate recipient. The second transaction ID is compared to the recorded first transaction ID to determine if they match at 308. If the transaction IDs do not match, the process ends at 314. In some examples, the claim request may further include additional data, such as a transaction amount, that may also be matched against recorded transaction data (e.g., matching a recipient-provided transaction amount value against a recorded transaction amount value may provide an additional point of verification, etc.).

Alternatively, if the transaction IDs match, the candidate recipient location is compared with the sender location to determine if it is within a defined range (e.g., within a defined geo-fence (e.g., location 124, etc.), within one or more nearby zip codes or other area codes, etc.) of the sender location at 310. If the candidate recipient location is not within the defined range of the sender location, the process ends at 314, but if the candidate recipient location is within the defined range of the sender location, a verification of the claim request that confirms the candidate recipient is the intended recipient is provided at 312.

In some examples, the defined range associated with the sender location is based on GPS location data of the sender's computing device (e.g., computing device 104, etc.). The sender location data includes a GPS location and the defined range may be a distance from the GPS location in any direction. The defined range results in a circular "geo-fence" around an acceptable area in which a recipient may claim the transaction.

Alternatively, the location data and/or the defined range may be based on other types of data, such as cellular-based location data, other network-based data (e.g., proximity to Wi-Fi access points, etc.), or user-provided location data (e.g., a zip code, location name, business or other entity name, etc.). If the defined range is a distance, the resulting geo-fence is typically circular with a radius of the defined range, but other geo-fence shapes and area definitions are also contemplated. For instance, if the location data is based on provided zip codes, the geo-fence may include the area of the provided zip code and/or other adjacent zip code areas. In another example, the location data and defined range may be based on a specifically defined geo-fence boundary associated with a location, such as the limits of a city, neighborhood, or building.

Further, the defined range may be based on other aspects of the transaction and/or preferences of the sender. In some examples, the defined range used in the comparison of the sender location and candidate recipient location is based on the amount of the transaction. For instance, one or more transaction amount thresholds may be associated with one or more possible defined ranges. A higher transaction amount may result in a smaller defined range requiring more fine-grained location data, as the security of the transaction may be considered more important based on the higher transaction amount. On the other hand, a lower transaction amount may result in a larger defined range requiring only coarse-grained location data. In an example, transactions with amounts of $10 or less may result in a defined range of one kilometer, while transactions with amounts of more than $10 may result in a defined range of 500 meters. In other examples, more and/or different amount threshold-defined range combinations are contemplated.

Alternatively, or additionally, the defined range may be based on aspects of the geographic location indicated by the sender location data. For instance, if a geographic area is known to have a higher or more likely occurrence of fraud, the defined range to satisfy the matching of the sender location and candidate recipient location may be smaller than in a geographic location known to have lower or less likely occurrence of fraud.

In another example, the sender may provide a defined range preference when requesting to initiate a transaction. A variety of possible ranges may be provided for use by the sender in the form of security level data, such as specific security levels or settings. For instance, a sender may be enabled to select from a low security level, a medium security level, and a high security level. The low security level may result in a larger defined range (e.g., one mile, one kilometer, etc.), while the medium security and high security levels may result in progressively smaller defined ranges to reflect a greater accuracy requirement when verifying the intended recipient. Alternatively, or additionally, the sender may be enabled to specifically define a range for use with the transaction, either by defining the ranges of the security levels or by specifically defining the range for the specific transaction (e.g., setting low security level range to two miles or setting the range of the transaction to two miles, etc.). Other methods of defining the range for the transaction are contemplated. For instance, the sender may be provided a map of the area and enabled to draw on or otherwise indicate a desired range or geo-fence for use with the transaction.

Figure 4:
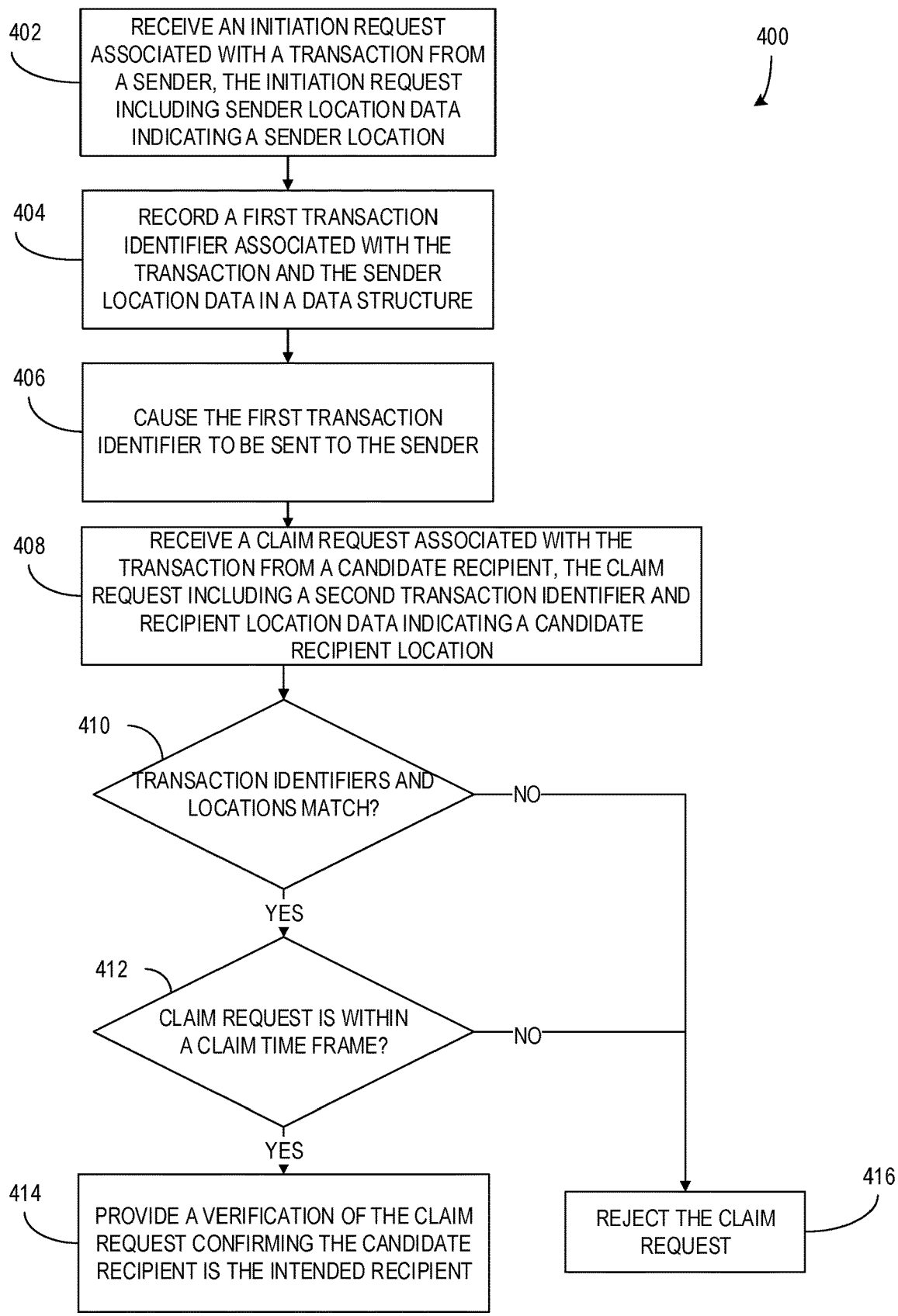
FIG. 4 is an exemplary flow chart illustrating facilitating a transaction including verifying a recipient based on a transaction identifier and associated location data within a defined claim time frame according to an embodiment.

FIG. 4 is an exemplary flow chart 400 illustrating facilitating a transaction including verifying a recipient based on a transaction identifier and associated location data within a defined claim time frame according to an embodiment. At 402, an initiation request associated with a transaction from a sender is received. The initiation request includes a sender location data indicating a sender location. At 404, a first transaction identifier associated with the transaction and the sender location data are recorded in a data structure, as described above with respect to 304 of FIG. 3.

At 406, the first transaction identifier is sent, transmitted, or otherwise provided to the sender, as described above. The first transaction identifier may be generated automatically upon an initiation request being received, such that the sender must be informed of the first transaction identifier to share it with the intended recipient.

At 408, a claim request associated with the transaction is received from a candidate recipient as described above with respect to 306 of FIG. 3. The first and second transaction identifiers are matched and the sender location data and candidate recipient location data are matched based on a defined range as described herein. If the transaction identifiers and locations do not match, the claim request is rejected at 416. If the transaction identifiers and locations do match, a time of the claim request is compared to a claim time frame associated with the transaction at 412.

In some examples, the sender may define a time frame in which the recipient must claim the transaction. Alternatively, or additionally, a default time frame may be used if the sender does not specifically define a time frame upon initiating the transaction. For instance, a system as described herein may be configured to assign a claim time frame of 24 hours to each initiated transaction by default. Senders may be enabled to assign customized claim time frames to transactions (e.g., a sender may assign a 30-minute claim time frame to a transaction if he/she expects the recipient to claim the transaction immediately, or the sender may assign a three-day claim time frame to a transaction if he/she expects the recipient to take more time to claim the transaction, etc.).

If, at 412, the claim request is within the claim time frame associated with the transaction, a verification of the claim request is provided confirming that the candidate recipient is the intended recipient as described above with respect to 312 of FIG. 3. Alternatively, if the claim request is not within the claim time frame associated with the transaction, the claim request is rejected at 416.

In some examples, a transaction verification system as described herein may be configured to handle assigned claim time frames using alternative techniques. For instance, a transaction, including a transaction identifier, sender location data, and other associated data, may be active in the transaction data structure for the length of the claim time frame. After the claim time frame expires, the transaction may be deactivated within the transaction data structure. As a result, rather than specifically checking claim requests against a defined claim time frame, the system checks for transaction identifiers and locations of active transactions. Transactions that have been deactivated will not be identified and late claim requests will be rejected.

Rejection of a claim request may include notifying the candidate recipient and/or the sender of the claim request rejection. For instance, a wallet application on the recipient's computing device may display a claim rejection notification on a screen interface or the like. The rejection notification may include additional information, such as a reason for rejection (e.g., outside of the transaction range, expired claim time frame, etc.). Further, a sender's wallet application may display a notification that claiming the transaction has failed upon the rejection of claim request and/or the expiration of a transaction claim time frame. The sender may be provided actions that may be taken as a result of the rejection, such as renewing or reinitiating the transaction, generating a new transaction ID for sharing with the recipient, expanding or otherwise changing the defined range of the transaction with respect to the sender location, etc.

Additional Example Scenarios

Aspects of the disclosure enable various additional scenarios, such as next described.

In an example, a customer at a restaurant wishes to pay a tip to a server. The customer opens a wallet application on a mobile phone and selects to initiate a transaction. The customer sets a transaction amount and selects for the transaction to go to an unknown recipient or recipient. After selecting an unknown recipient transaction, the wallet service provider associated with the wallet application obtains a passphrase, or transaction identifier, from a transaction verification service provider as described herein. At the transaction verification service provider, the passphrase is generated and stored along with GPS location data received from the customer's mobile phone via the wallet service provider. The passphrase is then provided to the customer via the wallet application. The customer informs the server about the tip transaction, including providing the passphrase to the server (e.g., by telling the server verbally, writing the passphrase on a receipt, etc.). The customer does not provide personal information to the server in order to execute the tip transaction. Later, the server accesses a similar wallet application and selects to claim a transaction. The server enters the passphrase and the server's mobile phone provides associated GPS location data. The transaction verification service provider is contacted to verify that the server is the intended recipient of the transaction as described herein. When the server is confirmed as the intended recipient, the tip is transferred from the customer's account to the server's account.

In another example, a sender is meeting up with a recipient to purchase a laptop computer from the recipient. Upon meeting, the sender and recipient agree upon a price for the laptop computer. The sender accesses a wallet application on the sender's mobile phone and selects to initiate a transaction to an unfamiliar recipient. The sender enters the agreed upon price and selects a passphrase (e.g., "laptop4sale", etc.) to be associated with the transaction. The sender then confirms the present meeting location on a map presented by the wallet application. Once the sender has initiated the transaction, the sender informs the recipient of the passphrase that was created. The recipient accesses a wallet application to claim the transaction. The recipient enters the passphrase that the sender provided and confirms the location on a map presented by the wallet application. Once the claim request is verified as described herein, the transaction is transferred from the sender's account to the recipient's account. The recipient may receive a confirmation of the transaction and then give the laptop to the sender in exchange for the transaction.

In another example, a sender is going to make a transaction to a recipient of an agreed upon amount. The sender uses a wallet service provider web portal to initiate the transaction, including providing a zip code associated with a location of the transaction and a time frame during which the transaction must be claimed. The sender does not provide information about the intended recipient when initiating the transaction. A transaction identifier in the form of a QR code is generated at a transaction verification service provider and provided to the sender via a wallet application associated with the wallet service provider on the sender's mobile phone. Upon meeting with the recipient to complete the transaction, the sender offers the QR code on the screen of the mobile phone to the recipient, who scans the QR code using another mobile phone. The recipient may then, at a later time within the claim time frame, request to claim the transaction by providing the scanned QR code and a zip code of the meeting location or a nearby zip code.

Exemplary Operating Environment

Figure 5:
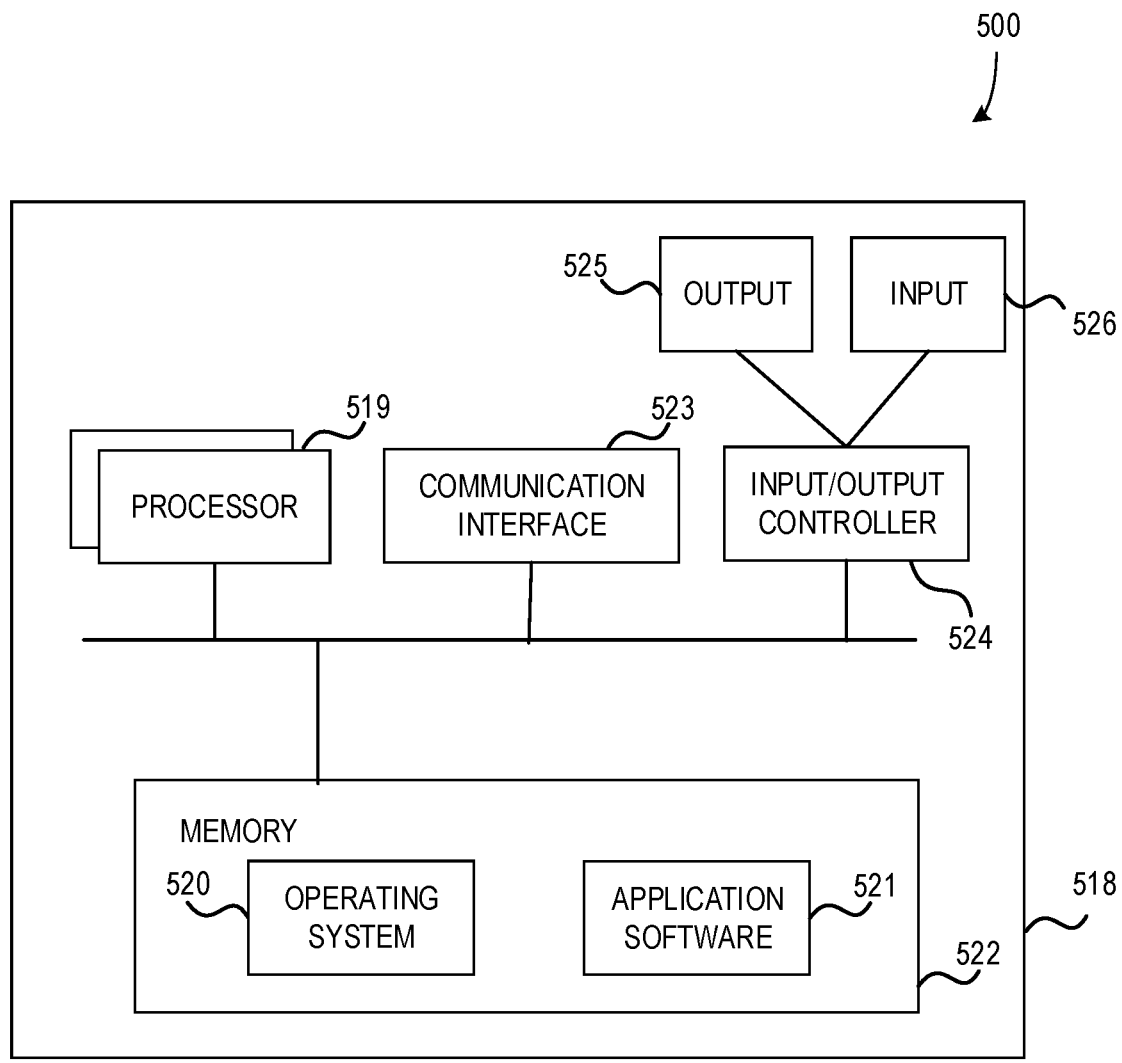
FIG. 5 illustrates a computing apparatus according to an embodiment as a functional block diagram.

The present disclosure is operable with a computing apparatus according to an embodiment as a functional block diagram 500 in FIG. 5. In an embodiment, components of a computing apparatus 518 may be implemented as a part of an electronic device according to one or more embodiments described in this specification. The computing apparatus 518 comprises one or more processors 519 which may be microprocessors, controllers or any other suitable type of processors for processing computer executable instructions to control the operation of the electronic device. Platform software comprising an operating system 520 or any other suitable platform software may be provided on the apparatus 518 to enable application software 521 to be executed on the device. According to an embodiment, verifying a transaction based on a transaction identifier and location data may be accomplished by software.

Computer executable instructions may be provided using any computer-readable media that are accessible by the computing apparatus 518. Computer-readable media may include, for example, computer storage media such as a memory 522 and communications media. Computer storage media, such as a memory 522, include volatile and non-volatile, removable and non-removable media implemented in any method or technology for storage of information such as computer readable instructions, data structures, program modules or the like. Computer storage media include, but are not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 522) is shown within the computing apparatus 518, it will be appreciated by a person skilled in the art, that the storage may be distributed or located remotely and accessed via a network or other communication link (e.g. using a communication interface 523).

The computing apparatus 518 may comprise an input/output controller 524 configured to output information to one or more output devices 525, for example a display or a speaker, which may be separate from or integral to the electronic device. The input/output controller 524 may also be configured to receive and process an input from one or more input devices 526, for example, a keyboard, a microphone or a touchpad. In one embodiment, the output device 525 may also act as the input device. An example of such a device may be a touch sensitive display. The input/output controller 524 may also output data to devices other than the output device, e.g. a locally connected printing device. In some embodiments, a user may provide input to the input device(s) 526 and/or receive output from the output device(s) 525.

The functionality described herein can be performed, at least in part, by one or more hardware logic components. According to an embodiment, the computing apparatus 518 is configured by the program code when executed by the processor 519 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Alternatively, or in addition to the other examples described herein, examples include any combination of the following:

A system for facilitating a transaction comprising:
at least one processor; and
at least one memory comprising computer program code, the at least one memory and the computer program code configured to, with the at least one processor, cause the at least one processor to:
receive an initiation request associated with a transaction from a sender, the initiation request including sender location data indicating a sender location;
record a first transaction identifier associated with the transaction and the sender location data in a data structure;
cause the first transaction identifier to be sent to the sender;
receive a claim request associated with the transaction from a candidate recipient, the request including a second transaction identifier and recipient location data indicating a candidate recipient location;
compare the first transaction identifier and the second transaction identifier;
compare the sender location and the candidate recipient location based on a defined range; and
based on the first and second transaction identifiers matching and the candidate recipient location being within the defined range of the sender location, provide a verification of the claim request confirming the candidate recipient is an intended recipient.

The system described above, wherein the sender location data includes global positioning system (GPS) data indicating the sender location as a GPS location and the defined range includes a distance from the GPS location.

The system described above, wherein the sender location data includes a sender zip code and the defined range includes at least one of the sender zip code or adjacent zip codes to the sender zip code.

The system described above, the at least one memory and the computer program code configured to, with the at least one processor, further cause the at least one processor to generate the first transaction identifier in response to the initiation request.

The system described above, wherein the initiation request further includes a transaction amount and the defined range is based on the transaction amount.

The system described above, wherein when the transaction amount is less than a transaction threshold, the defined range is a first range; and
when the transaction amount is greater than the transaction threshold, the defined range is a second range, the first range exceeding the second range.

The system described above, wherein the initiation request further includes security level data and the defined range is based on the security level data.

The system described above, wherein providing the verification of the claim request is further based on receiving the claim request within a defined time range relative to receiving the initiation request.

The system described above, wherein the initiation request is received via a first application programming interface (API) and the claim request is received via a second API.

A computerized method for facilitating a transaction, the method comprising:
receiving an initiation request associated with a transaction from a sender, the initiation request including sender location data indicating a sender location;
recording a first transaction identifier associated with the transaction and sender location data in a data structure;
receiving a claim request associated with the transaction from a candidate recipient, the claim request including a second transaction identifier and recipient location data indicating a candidate recipient location;
comparing the first transaction identifier and the second transaction identifier;
comparing the sender location and the candidate recipient location based on a defined range; and
based on the first and second transaction identifiers matching and the candidate recipient location being within the defined range of the sender location, providing a verification of the claim request confirming the candidate recipient is an intended recipient.

The computerized method described above, wherein the sender location data includes global positioning system (GPS) data indicating the sender location as a GPS location and the defined range includes a distance from the GPS location.

The computerized method described above, wherein the sender location data includes a sender zip code and the defined range includes at least one of the sender zip code or adjacent zip codes to the sender zip code.

The computerized method described above, further comprising generating the first transaction identifier in response to the initiation request.

The computerized method described above, wherein the initiation request further includes the first transaction identifier.

The computerized method described above, wherein the initiation request further includes a transaction amount and the defined range is based on the transaction amount.

The computerized method described above, wherein when the transaction amount is less than a transaction threshold, the defined range is a first range; and
when the transaction amount is greater than the transaction threshold, the defined range is a second range, the first range exceeding the second range.

The computerized method described above, wherein the initiation request further includes security level data and the defined range is based on the security level data.

The computerized method described above, wherein providing the verification of the claim request is further based on receiving the claim request within a defined time range relative to receiving the initiation request.

One or more computer storage media having computer-executable instructions for facilitating a transaction that, upon execution by a processor, cause the processor to at least:
receive an initiation request associated with a transaction from a sender, the initiation request including sender location data indicating a sender location;
record a first transaction identifier associated with the transaction and the sender location data in a data structure;
receive a claim request associated with the transaction from a candidate recipient, the request including a second transaction identifier and recipient location data indicating a candidate recipient location;
compare the first transaction identifier and the second transaction identifier;
compare the sender location and the candidate recipient location based on a defined range; and
based on the first and second transaction identifiers matching and the candidate recipient location being within the defined range of the sender location, provide a verification of the claim request confirming the candidate recipient is an intended recipient.

The one or more computer storage media described above, wherein the sender location data includes global positioning system (GPS) data indicating the sender location as a GPS location and the defined range includes a distance from the GPS location.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute exemplary means for facilitating a transaction by verifying a claim request based on a transaction identifier and location data. The illustrated one or more processors 519 together with the computer program code stored in memory 522 constitute exemplary processing means for confirming the intended recipient of the transaction based on the transaction identifier and location data.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for facilitating a transaction comprising:
at least one processor; and
at least one memory comprising computer program code, the at least one memory and the computer program code configured to, with the at least one processor, cause the at least one processor to:
receive, by a server computer associated with a transaction verification service, a request associated with a transaction, initiated on a sender mobile device of a sender, via a first wallet application executing on the sender mobile device, the request including sender global positioning system (GPS) location data indicating a sender location;
record a first transaction identifier associated with the transaction and the sender location in a data structure;
cause the first transaction identifier to be sent to the sender;
receive a claim request associated with the transaction, initiated on a candidate recipient mobile device of a candidate recipient, via a second wallet application executing on the candidate recipient mobile device, the request including a second transaction identifier and candidate recipient GPS location data indicating a candidate recipient location;
compare the first transaction identifier and the second transaction identifier;
compare the sender location and the candidate recipient location to determine whether the sender location and the candidate recipient location are within a defined range of the sender location; and
based on the first and the second transaction identifiers matching and the candidate recipient location being within the defined range, provide a verification of the claim request confirming that the candidate recipient is an intended recipient.

2. The system of claim 1, wherein the sender GPS location data indicates the sender location as a GPS location and the defined range includes the defined range as being within a defined geo-fence.

3. The system of claim 1, wherein the sender location includes a sender zip code and the defined range includes at least one of the sender zip code or adjacent zip codes to the sender zip code.

4. The system of claim 1, wherein providing the verification of the claim request includes making a one-time peer-to-peer transaction for the claim request using the first wallet application and the second wallet application.

5. The system of claim 1, wherein the request further includes a transaction amount and the defined range is based on the transaction amount.

6. The system of claim 5, wherein when the transaction amount is less than a transaction threshold, the defined range is a first range; and
when the transaction amount is greater than the transaction threshold, the defined range is a second range, the first range exceeding the second range.

7. The system of claim 1, wherein the request further includes security level data and the defined range is based on the security level data.

8. The system of claim 1, wherein providing the verification of the claim request is further based on receiving the claim request within a defined time range relative to receiving the request.

9. The system of claim 1, wherein the intended recipient is unknown, and the sender shares the first transaction identifier with the intended recipient without sharing personal information of the sender and without knowing personal information of the intended recipient.

10. A computerized method for facilitating a transaction, the method comprising:
receiving, by a server computer associated with a transaction verification service, a request associated with a transaction initiated by a sender, via a first wallet application executing on a sender mobile device, the request including sender global positioning system (GPS) location data indicating a sender location;
recording a first transaction identifier associated with the transaction and sender location in a data structure;
causing the first transaction identifier to be sent to the sender;
receiving a claim request associated with the transaction, initiated on a candidate recipient mobile device, via a second wallet application executing on the candidate recipient mobile device of a candidate recipient, the claim request including a second transaction identifier and candidate recipient GPS location data indicating a candidate recipient location;
comparing the first transaction identifier and the second transaction identifier;
comparing the sender location and the candidate recipient location to determine whether the sender location and the candidate recipient location are within a defined range of the sender location; and
based on the first and the second transaction identifiers matching and the candidate recipient location being within the defined range, providing a verification of the claim request confirming that the candidate recipient is an intended recipient.

11. The computerized method of claim 10, wherein the sender GPS location data indicates the sender location as a GPS location and the defined range includes the defined range as being within a defined geo-fence.

12. The computerized method of claim 10, wherein the sender location includes a sender zip code and the defined range includes at least one of the sender zip code or adjacent zip codes to the sender zip code.

13. The computerized method of claim 10, wherein providing the verification of the claim request includes making a one-time peer-to-peer transaction for the claim request using the first wallet application and the second wallet application.

14. The computerized method of claim 10, wherein the intended recipient is unknown, and the sender shares the first transaction identifier with the intended recipient without sharing personal information of the sender and without knowing personal information of the intended recipient.

15. The computerized method of claim 10, wherein the request further includes a transaction amount and the defined range is based on the transaction amount.

16. The computerized method of claim 15, wherein when the transaction amount is less than a transaction threshold, the defined range is a first range; and
when the transaction amount is greater than the transaction threshold, the defined range is a second range, the first range exceeding the second range.

17. The computerized method of claim 10, wherein the request further includes security level data and the defined range is based on the security level data.

18. The computerized method of claim 10, wherein providing the verification of the claim request is further based on receiving the claim request within a defined time range relative to receiving the request.

19. One or more computer storage media having computer-executable instructions for facilitating a transaction that, upon execution by a processor, cause the processor to at least:
receive, by a server computer associated with a transaction verification service, a request associated with a transaction, initiated on a sender mobile device of a sender, via a first wallet application executing on the sender mobile device, the request including sender global positioning system (GPS) location data indicating a sender location;
record a first transaction identifier associated with the transaction and the sender location in a data structure;
receive a claim request associated with the transaction initiated on a candidate recipient mobile device, via a second wallet application executing on the candidate recipient mobile device of a candidate recipient, the request including a second transaction identifier and candidate recipient GPS location data indicating a candidate recipient location;
compare the first transaction identifier and the second transaction identifier;
compare the sender location and the candidate recipient location to determine whether the sender location and the candidate recipient location are within a defined range of the sender location; and
based on the first and the second transaction identifiers matching and the candidate recipient location being within the defined range, provide a verification of the claim request confirming that the candidate recipient is an intended recipient.

20. The one or more computer storage media of claim 19, wherein providing the verification of the claim request includes making a one-time peer-to-peer transaction for the claim request using the first wallet application and the second wallet application.

* * * * *